United States Patent
Yoo et al.

(10) Patent No.: US 10,109,241 B2
(45) Date of Patent: Oct. 23, 2018

(54) LIGHT VALVE PANEL AND LIQUID CRYSTAL DISPLAY USING THE SAME

(71) Applicant: LG DISPLAY CO., LTD., Seoul (KR)

(72) Inventors: Ooksang Yoo, Paju-si (KR); Juyoung Lee, Paju-si (KR); Sangjin Nam, Cheonan-si (KR); Seungjin Yoo, Goyang-si (KR)

(73) Assignee: LG DISPLAY CO., LTD., Seoul (KR)

( * ) Notice: Subject to any disclaimer, the term of this patent is extended or adjusted under 35 U.S.C. 154(b) by 20 days.

(21) Appl. No.: 15/222,700

(22) Filed: Jul. 28, 2016

(65) Prior Publication Data

US 2017/0032744 A1    Feb. 2, 2017

(30) Foreign Application Priority Data

Jul. 29, 2015  (KR) .................. 10-2015-0107596

(51) Int. Cl.
| | |
|---|---|
| *G09G 5/00* | (2006.01) |
| *G09G 3/34* | (2006.01) |
| *G09G 3/20* | (2006.01) |
| *G09G 3/36* | (2006.01) |
| *G02F 1/1343* | (2006.01) |

(Continued)

(52) U.S. Cl.
CPC ......... *G09G 3/3406* (2013.01); *G02F 1/1368* (2013.01); *G02F 1/13439* (2013.01); *G02F 1/133512* (2013.01); *G02F 1/133528* (2013.01); *G02F 1/134309* (2013.01); *G02F 1/136286* (2013.01); *G09G 3/2007* (2013.01); *G09G 3/3688* (2013.01); *G02F 2201/121* (2013.01); *G02F 2201/123* (2013.01); *G09G 2300/0426* (2013.01); *G09G 2310/08* (2013.01); *G09G 2320/0233* (2013.01);

(Continued)

(58) Field of Classification Search
CPC ............. H05B 33/0815; G09G 3/3688; G09G 2300/0426; G09G 2310/08; G09G 2320/0233; G09G 2320/0242; G02F 1/133512; G02F 1/133528; G02F 1/134309; G02F 1/13439; G02F 1/136286; G02F 1/1368; G02F 2201/121; G02F 2201/123
USPC .................................... 345/690, 90; 349/42
See application file for complete search history.

(56) References Cited

U.S. PATENT DOCUMENTS

2008/0259016 A1* 10/2008 Tanaka .................. G09G 3/3688
                                                   345/90
2011/0181625 A1*  7/2011 Shin .................... H05B 33/0815
                                                   345/690

(Continued)

*Primary Examiner* — Insa Sadio
(74) *Attorney, Agent, or Firm* — Birch, Stewart, Kolasch & Birch, LLP

(57) ABSTRACT

A light valve panel and a liquid crystal display using the same are discussed. The light valve panel according to an embodiment includes a transparent electrode layer having a plurality of blocks supplied with a voltage through data input lines. The transparent electrode layer has a low resistance or has a high resistance. When a transparent electrode layer has low resistance, each block is divided into a plurality of segment electrodes connected through a resistance pattern. A voltage is distributed to the plurality of segment electrodes of each block based on the resistance pattern. When a transparent electrode layer has high resistance, the voltage distribution in each block is based on a resistance difference that varies based on a distance between voltage feeding positions.

20 Claims, 17 Drawing Sheets

D1 : ON Block
D2 : OFF Block

(51) Int. Cl.
*G02F 1/1362* (2006.01)
*G02F 1/1368* (2006.01)
*G02F 1/1335* (2006.01)

(52) U.S. Cl.
CPC ............... *G09G 2320/0242* (2013.01); *G09G 2320/0276* (2013.01); *G09G 2320/0626* (2013.01)

(56) References Cited

U.S. PATENT DOCUMENTS

2011/0279749 A1* 11/2011 Erinjippurath ....... G09G 3/3426 349/61
2015/0131016 A1* 5/2015 Kim ................... H05B 33/0815 349/42

* cited by examiner (A)

(B)

(C)

LIGHT VALVE PANEL AND LIQUID CRYSTAL DISPLAY USING THE SAME

This application claims the priority benefit of Korean Patent Application No. 10-2015-0107596 filed on Jul. 29, 2015, the entire contents of which is incorporated herein by reference for all purposes as if fully set forth herein.

BACKGROUND OF THE INVENTION

Field of the Invention

The present disclosure relates to a liquid crystal display that includes controlling an amount of light incident on a display panel based on a luminance distribution of an input image.

Discussion of the Related Art

Various flat panel displays, such as a liquid crystal display (LCD), a plasma display panel (PDP), an organic light emitting diode (OLED) display, and an electrophoresis display (EPD), have been developed. A liquid crystal display displays an image by controlling an electric field applied to liquid crystal molecules based on a data voltage and adjusting a light transmittance of pixels. An active matrix liquid crystal display includes a thin film transistor (TFT) in each pixel.

A liquid crystal display includes a display panel having a liquid crystal layer, a backlight unit irradiating light onto the display panel, a source driver integrated circuit (IC) for supplying a data voltage to data lines of the display panel, a gate driver IC for supplying gate pulses (or scan pulses) to gate lines (or scan lines) of the display panel, a control circuit for controlling the source driver IC and the gate driver IC, a light source driving circuit for driving light sources of the backlight unit, and other display-related layers.

Gray levels of an input image are produced by the data voltage applied to the pixels of the display panel. A liquid crystal display is not good in displaying a dark image due to the backlight. This is because the backlight unit irradiates a uniform amount of light onto the entire screen of the display panel regardless of a luminance distribution of the input image. Hence, the liquid crystal display has a limited contrast ratio.

SUMMARY OF THE INVENTION

The present invention is directed to a light valve panel capable of improving a contrast ratio by controlling an amount of light incident on a display panel based on a luminance distribution of an input image and a liquid crystal display using the light valve panel. The light valve panel is capable of controlling an amount of light incident on each pixel of the display panel. The light valve panel is further capable of reducing luminance and color distortion at a side viewing angle as well as preventing a bright line phenomenon.

In one aspect, there is provided a light valve panel including blocks supplied with a voltage through data input lines, each block being divided into segment electrodes connected through a resistance pattern that enables generation of a voltage distribution to the segment electrodes of each block.

In another aspect, there is provided a light valve panel including a single transparent electrode layer supplied with a voltage through data input lines. The data input lines are connected to each block of the single transparent electrode layer, the blocks being previously set in the single transparent electrode layer in a manner that enables generation of a voltage distribution within each block.

In yet another aspect, there is provided a liquid crystal display including a display panel including pixels, on which an input image is displayed, a backlight unit configured to irradiate light onto the display panel, and a light valve panel disposed between the display panel and the backlight unit and configured to adjust an amount of light irradiated by the backlight unit depending on the input image. The light valve panel includes blocks supplied with a voltage through data input lines, each block being divided into segment electrodes connected through a resistance pattern that enables generation of a voltage distribution to the segment electrodes of each block.

BRIEF DESCRIPTION OF THE DRAWINGS

The accompanying drawings, which are included to provide a further understanding of the invention and are incorporated in and constitute a part of this specification, illustrate embodiments of the invention and together with the description explain the principles of the invention. In the drawings.

DETAILED DESCRIPTION OF THE EMBODIMENTS

Reference will now be made in example embodiments of the invention, of which are illustrated in the accompanying drawings. Wherever possible, the same reference numbers will be used throughout the drawings to refer to the same or like parts. It will be paid attention that detailed description of known arts will be omitted.

Figure 1:
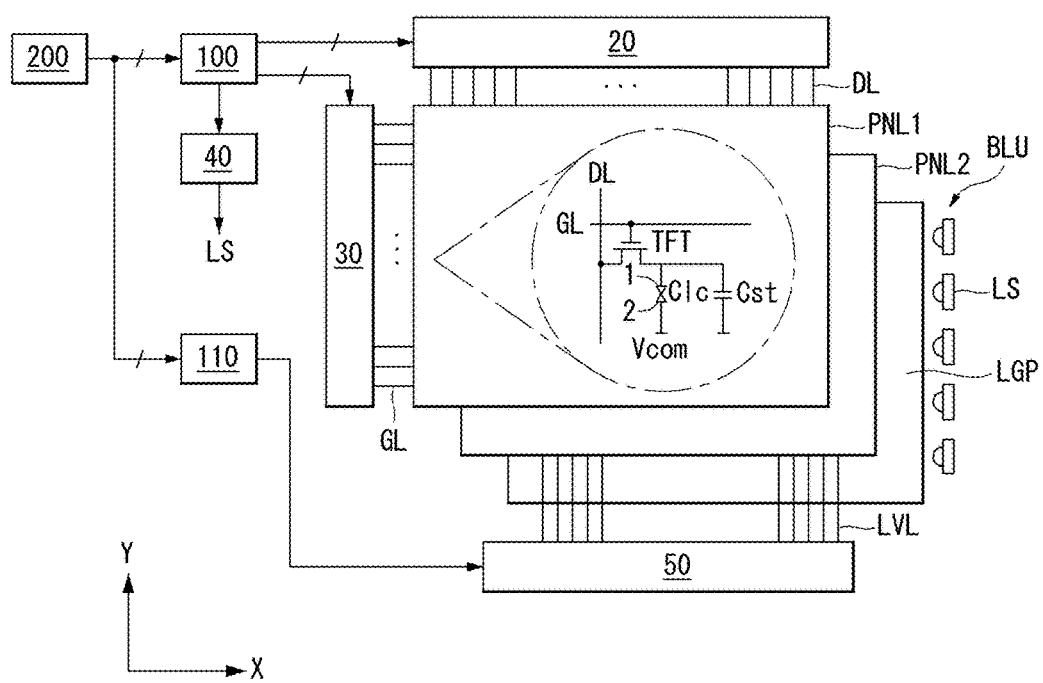
FIG. 1 is a block diagram of a liquid crystal display according to an embodiment of the invention.
Figure 2:
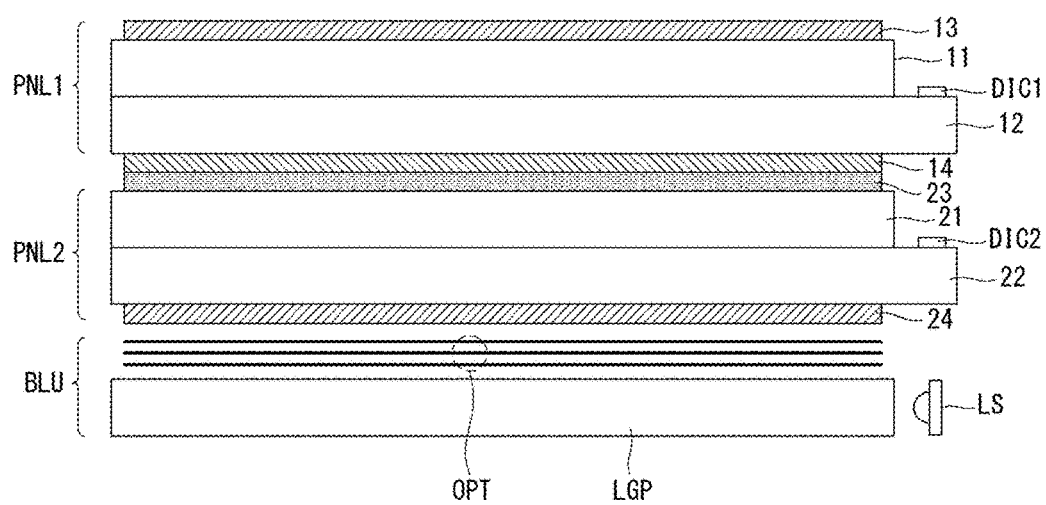
FIG. 2 is a cross-sectional view illustrating a stack structure of a display panel, a light valve panel, and a backlight unit shown in FIG. 1.

Referring to FIGS. 1 and 2, a liquid crystal display according to an embodiment of the invention includes a display panel PNL1 including a pixel array, a backlight unit BLU irradiating light onto the display panel PNL1, a light valve panel PNL2 disposed between the display panel PNL1 and the backlight unit BLU, a first panel driving circuit, a second panel driving circuit, and a backlight driving circuit 40.

The display panel PNL1 includes an upper plate and a lower plate, that are positioned opposite each other with a liquid crystal layer interposed therebetween. The pixel array of the display panel PNL1 includes pixels arranged in a matrix form based on a crossing structure of data lines DL and gate lines GL and displays an input image. Each pixel adjusts a transmission amount of light using liquid crystal molecules driven by a voltage difference between a pixel electrode 1 charged with a data voltage through a thin film transistor (TFT) and a common electrode 2 supplied with a common voltage Vcom. The pixel electrode 1 and the common electrode 2 may be formed of a transparent electrode material, for example, indium tin oxide (ITO).

The display panel PNL1 may be implemented in any known liquid crystal mode including a twisted nematic (TN) mode, a vertical alignment (VA) mode, an in-plane switching (IPS) mode, a fringe field switching (FFS) mode, etc.

The lower plate of the display panel PNL1 includes a lower transparent substrate 12. On the lower transparent substrate 12, the data lines DL, the gate lines GL, the common electrode 2, TFTs, the pixel electrodes 1 connected to the TFTs, storage capacitors Cst connected to the pixel electrodes 1, and the like are formed. The TFTs are respectively formed in subpixels and are connected to the pixel electrodes 1. The TFTs may be implemented as an amorphous silicon (a-Si) TFT, a low temperature polysilicon (LTPS) TFT, an oxide TFT, and the like. The TFTs are respectively connected to the pixel electrodes 1 of the subpixels. The common electrode 2 and the pixel electrode 1 are separated from each other with an insulating layer interposed therebetween.

The upper plate of the display panel PNL1 includes an upper transparent substrate 11. On the upper transparent substrate 11, a color filter array including black matrixes and color filters is formed.

Polarizing films 13 and 14 are respectively attached to the upper plate and the lower plate of the display panel PNL1. Alignment layers for setting a pretilt angle of liquid crystals are respectively formed on the upper plate and the lower plate of the display panel PNL1. A spacer for maintaining a cell gap of liquid crystal cells Clc may be formed between the upper plate and the lower plate of the display panel PNL1.

The backlight unit BLU may be implemented as a direct type backlight unit or an edge type backlight unit. The backlight unit BLU includes light sources LS, a light guide plate LGP, an optical sheet OPT, and may include other light directing layers. The light source LS may be implemented as a point light source such as a light emitting diode (LED). Luminances of the light sources LS are individually adjusted depending on a driving voltage supplied by the backlight unit driver 40. When a direct backlight unit, the light sources are located along a surface of the display panel PNL 1. When an edge type backlight unit, the light sources are located in a vicinity of an edge of the display panel PNL 1. The optical sheet OPT includes one or more prism sheets and one or more diffuser sheets. The optical sheet OPT diffuses light incident from the light guide plate LGP and refracts a travelling path of light at an angle substantially vertical to a light incident surface of the display panel PNL1.

The light valve panel PNL2 is disposed between the display panel PNL1 and the backlight unit BLU. The light valve panel PNL2 drives liquid crystal molecules based on a difference between voltages applied to an upper plate and a lower plate of the light valve panel PNL2 and adjusts an amount of light to be irradiated onto the display panel PNL1. The light valve panel PNL2 is a liquid crystal shutter that adjusts an amount of light in synchronization with an input image using electrically controlled liquid crystal molecules. The light valve panel PNL2 includes an upper plate and a lower plate, that are positioned opposite each other with a liquid crystal layer interposed therebetween. The light valve panel PNL2 may be implemented in a twisted nematic (TN) mode. Other liquid crystal modes may be used.

The light valve panel PNL2 may be divided into blocks, and each block may be subdivided into segment electrodes. A voltage is distributed to the segment electrodes of each block due to resistances between the segment electrodes. Hence, a luminance of the block may vary on a per segment electrode basis.

The lower plate of the light valve panel PNL2 includes a lower transparent substrate 22. The lower transparent substrate 22 includes data input lines LVL that are respectively connected to the blocks. Each of the blocks may include two or more segment electrodes arranged in a horizontal direction and may be divided into two or more segment electrodes in a vertical direction. The data input line LVL is connected to the segment electrode and directly supplies a voltage to each block. Thus, the light valve panel PNL2 does not require the TFT and the gate line. Hence, the embodiment of the invention can prevent a moire phenomenon and a bright line phenomenon and can further reduce the number of manufacturing processes of the light valve panel PNL2 by simplifying a structure of the light valve panel PNL2, thereby increasing a yield. Further, the embodiment of the invention omits a gate driving circuit for driving the light valve panel PNL2 and thus can implement a lower cost light valve panel PNL2.

The segment electrode, a resistance pattern between blocks, and the data input line LVL are formed of a transparent electrode material, such as indium tin oxide (ITO) and indium zinc oxide (IZO). The data input line LVL may be configured as a transparent electrode, so as to prevent the moire phenomenon. The data input line LVL may be formed of a low resistance metal, so as to compensate for a resistance of the transparent electrode. The lower plate of the light valve panel PNL2 does not include the TFT and the gate line.

The segment electrode may have the same size as the pixel electrode 1, so that it is opposite to the pixel of the display panel PNL1. Other sizes may be used. The segment electrode is supplied with the data voltage through the data input line LVL of the light valve panel PNL2.

The liquid crystal molecules of the light valve panel PNL2 are driven based on a difference between a voltage of the segment electrode and a common voltage and adjust an amount of light irradiated onto the display panel PNL1. A data voltage applied to the segment electrode through the data input line LVL varies depending on a luminance distribution of the input image. The common voltage is applied to all of the segment electrodes at the same voltage level in the same manner as the common voltage Vcom of the display panel PNL1.

The upper plate of the light valve panel PNL2 includes an upper transparent substrate 21. Common electrodes are formed on the upper transparent substrate 21. The common electrode may be formed of a transparent electrode material, for example, indium tin oxide (ITO). The upper plate of the light valve panel PNL2 does not include a color filter for increasing a light transmittance. The upper plate of the light valve panel PNL2 may include a black matrix, if necessary or desired.

A polarizing film 24 is attached to the lower plate of the light valve panel PNL2. Alignment layers are respectively formed on surfaces contacting the liquid crystal layer at the upper plate and the lower plate of the light valve panel PNL2. A spacer for maintaining a cell gap of the liquid crystal cells Clc may be formed between the upper plate and the lower plate of the light valve panel PNL2.

The display panel PNL1 and the light valve panel PNL2 may be attached to each other using an adhesive 23, for example, an optical clear adhesive (OCA).

The first panel driving circuit includes a first timing controller 100, a first data driver 20, and a gate driver 30. The first panel driving circuit applies data of an input image to the pixels.

A transparent electrode layer of the light valve panel PNL2 may be divided into segment electrodes and include a resistance pattern connected between the segment electrodes when a transparent electrode layer having a low resistance. As an alternative, a lower electrode of the light valve panel PNL2 may be configured as a single transparent electrode layer having a high resistance. Because a large amount of current flows in the transparent electrode layer having the high resistance at a voltage feeding position, a voltage drop increases at the voltage feeding position. Hence, a peak voltage may appear at the voltage feeding position. The voltage feeding position is a connection portion of the data input line LVL and the transparent electrode layer. As a resistance difference between the voltage feeding position and another voltage feeding position far away from the voltage feeding position increases, the voltage drop may increase.

The transparent electrode layer having the high resistance may be formed of indium zinc oxide (IZO). Other materials may be used. Thus, when the data input lines LVL are connected to blocks at voltage feeding positions in the transparent electrode layer, a luminance of the block may be adjusted in a gradation without dividing the block into a resistance pattern and segment electrodes.

Although the transparent electrode layer of the high resistance is not divided, the voltage distribution may be generated because of the high resistance. Therefore, a separate resistor does not need to be added. Mass-produced ITO may have a sheet resistance of about 50 ohm/□ (or ohm/sq) and a maximum sheet resistance of about 250 ohm/□ (or ohm/sq). There is indium zinc oxide (IZO) as an example of a transparent electrode layer of a high resistance greater than the sheet resistance of ITO.

In FIG. 2, "DIC1" indicates an integrated circuit (IC), into which a circuit of the first data driver 20 is integrated. The first panel driving circuit may be integrated into one IC.

The first timing controller 100 transmits digital video data of an input image received from a host system 200 to the first data driver 20. The first timing controller 100 receives timing signals synchronized with the data of the input image from the host system 200. The timing signals include a vertical sync signal Vsync, a horizontal sync signal Hsync, a data enable signal DE, and a clock CLK, etc. The first timing controller 100 controls operation timings of the first data driver 20 and the gate driver 30 based on the timing signals Vsync, Hsync, DE, and CLK received together with pixel data of the input image. The first timing controller 100 may transmit a polarity control signal for controlling a polarity of the pixel array to each of source driver ICs of the first data driver 20.

Output channels of the first data driver 20 are connected to the data lines DL of the pixel array. The first data driver 20 receives the digital video data of the input image from the first timing controller 100. The first data driver 20 converts the digital video data of the input image into positive and negative gamma compensation voltages under the control of the first timing controller 100 and outputs positive and negative data voltages. An output voltage of the first data driver 20 is supplied to the data lines DL. The first data driver 20 inverts a polarity of the data voltage to be supplied to the pixels under the control of the first timing controller 100.

The gate driver 30 sequentially supplies gate pulses synchronized with the data voltage to the gate lines GL under the control of the first timing controller 100. The gate pulses output from the gate driver 30 are synchronized with the data voltage supplied to the data lines DL.

The second panel driving circuit includes a second timing controller 110 and a second data driver 50. The second panel driving circuit adjusts an amount of light transmitted by the light valve panel PNL2 in synchronization with an input image and improves a contrast ratio of an image reproduced on the display panel PNL1. In FIG. 2, "DIC2" indicates an IC, into which a circuit of the second data driver 50 is integrated. The second panel driving circuit may be integrated into one IC.

The second timing controller 110 transmits data of an input image to the second data driver 50. The second timing controller 110 receives timing signals synchronized with the data of the input image from the host system 200. The timing signals include a vertical sync signal Vsync, a horizontal sync signal Hsync, a data enable signal DE, and a clock CLK, etc. The second timing controller 110 controls operation timing of the second data driver 50 based on the timing signals Vsync, Hsync, DE, and CLK received together with pixel data of the input image.

The second data driver 50 receives digital video data of an input image from the second timing controller 110. The second data driver 50 converts the digital video data of the input image into positive and negative gamma compensation voltages under the control of the second timing controller 110 and outputs positive and negative data voltages. An output voltage of the second data driver 50 is supplied to the data input lines LVL. The second data driver 50 inverts a polarity of the data voltage to be supplied to the pixels under the control of second timing controller 110.

The first and second panel driving circuits may be integrated in various types. For example, the first and second timing controllers 100 and 110 may be integrated into one IC. The first and second panel driving circuits may be integrated into one IC.

The host system 200 may be one of a television system, a set-top box, a navigation system, a DVD player, a Blu-ray player, a personal computer (PC), a home theater system, a phone system, and other systems that include or operate in conjunction with a display.

The liquid crystal display according to the embodiment of the invention further includes a power unit. The power unit generates voltages required to drive the display panel PNL1 and the light valve panel PNL2 using a DC-DC converter. The voltages includes a high potential power voltage VDD, a logic power voltage VCC, a gamma reference voltage, a gate high voltage VGH, a gate low voltage VGL, a common voltage Vcom, and other voltages, as necessary. The high potential power voltage VDD is a maximum value of the data voltage, to which the pixels of the display panel PNL1 will be charged. The logic power voltage VCC is an IC power voltage of the first and second panel driving circuits. The gate high voltage VGH is a high logic voltage of the gate pulse, which is set to be equal to or greater than a threshold voltage of the TFTs of the pixel array. The gate low voltage VGL is a low logic voltage of the gate pulse, which is set to be less than the threshold voltage of the TFTs of the pixel array. The gate high voltage VGH and the gate low voltage VGL are supplied to the gate driver 30. The gate pulse swings between the gate high voltage VGH and the gate low voltage VGL. The common voltage Vcom is supplied to the common electrode 2 of the liquid crystal cells Clc. The power unit divides the high potential power voltage VDD and generates the gamma reference voltage. The gamma reference voltage is divided by a voltage divider circuit installed inside the first data driver 20 and is divided into positive and negative gamma reference voltages depending on a gray scale.

The light valve panel PNL2 precisely controls an amount of light irradiated onto each pixel in synchronization with data of an input image displayed on the pixel array and maximizes a contrast ratio of an image reproduced on the display panel PNL1. This is described with reference to FIG. 3.

Figure 3:
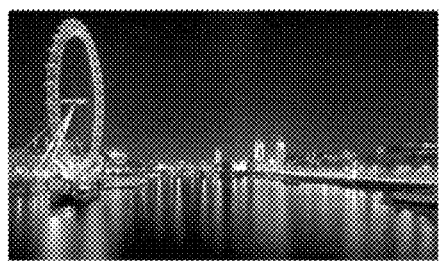
FIG. 3 illustrates an improvement effect of a contrast ratio obtained from a light valve panel.
Figure 3:
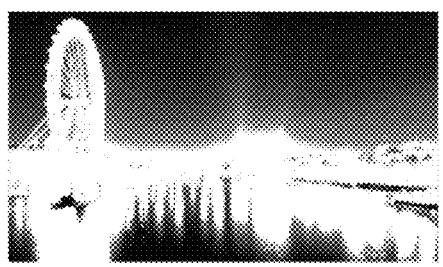
Figure 3:

In FIG. 3, (A) illustrates an example of a sample image displayed on the display panel PNL1 when backlight is directly irradiated onto the display panel PNL1 without the light valve panel PNL2; (B) illustrates a sample image reproduced on the light valve panel PNL2; and (C) illustrates a contrast ratio of an image reproduced on the liquid crystal display when disposing the light valve panel PNL2 between the display panel PNL1 and the backlight unit BLU. The light valve panel PNL2 can improve the contrast ratio by further decreasing an amount of light incident on a dark portion of the input image.

Figure 4:
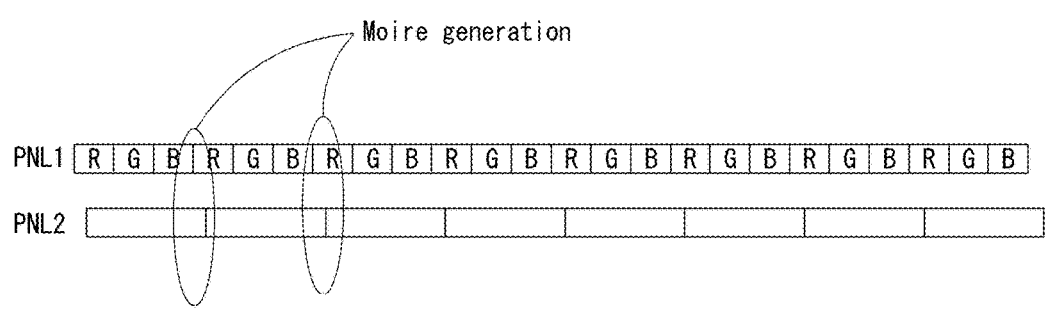
FIG. 4 illustrates moire appearing by an inference of light generated when metal lines of a display panel and metal lines of a light valve panel overlap each other.

Lines are formed on each of the display panel PNL1 and the light valve panel PNL2. The lines are not transparent and may be formed as metal lines having a high reflectance. The metal lines include data lines of a vertical direction, data input lines of the vertical direction, gate lines of a horizontal direction, and common lines of the horizontal direction. The common lines are connected to the common electrodes of the pixels and supply the common voltage Vcom to the common electrodes. Because the metal lines having the high reflectance lead to a reduction in the contrast ratio by reflecting external light, the metal lines and the TFTs are covered by a black matrix pattern. In this instance, when the lines of the display panel PNL1 overlap the lines of the light valve panel PNL2, the moiréphenomenon may be generated in the vertical and horizontal directions due to interference of light if a misalignment is generated as shown in FIG. 4. In order to reduce the moiréphenomenon, a diffuser sheet diffusing light may be disposed between the display panel PNL1 and the light valve panel PNL2. On the other hand, the embodiment of the invention removes the horizontal lines from the light valve panel PNL2 and forms the electrodes of the upper and lower plates and the lines using a transparent electrode material, thereby minimizing the moiréphenomenon without adding the diffuser sheet.

Figure 5:
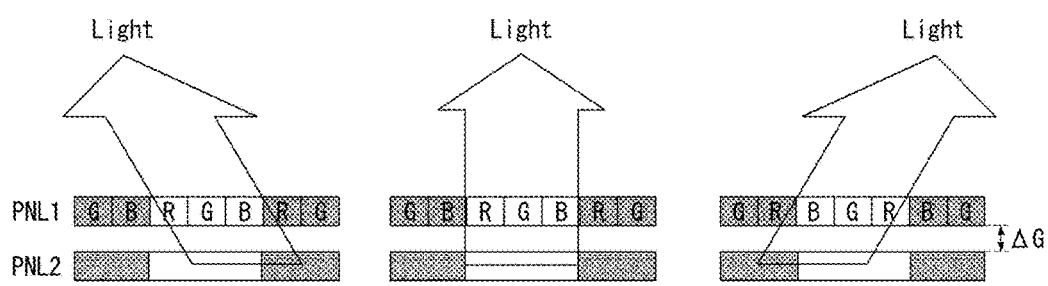
FIG. 5 illustrates a distortion of color generated by a gap between a display panel and a light valve panel.

When a user watches the liquid crystal display at a front viewing angle, the user may watch an image at a desired luminance. However, when the user watches the liquid crystal display at a side viewing angle, a luminance and a color of the image may change. As shown in a middle diagram of FIG. 5, the front viewing angle is a viewing angle obtained when the user watches a display surface of the display panel PNL1 at an angle of 90°. The side viewing angle is a viewing angle obtained when the user watches the display surface of the display panel PNL1 at an angle leaned to the left side or the right side. In FIG. 5, a left diagram is shown at a left viewing angle of 45°, and a right diagram is shown a right viewing angle of 45°. In particular, because a predetermined gap ΔG is unconditionally formed between the display panel PNL1 and the light valve panel PNL2, color distortion of the liquid crystal display including the light valve panel PNL2 may more clearly appear at the side viewing angle. In FIG. 5, only blocks of the light valve panel PNL2 positioned under pixels represented with white color transmit light, and other blocks of the light valve panel PNL2 block light. In this instance, when the user watches the liquid crystal display at the side viewing angle, luminances of some colors are reduced, and the color distortion appears. A method for adjusting a luminance of the light valve panel PNL2 shown in FIG. 6 may be considered, so as to improve the luminance of the side viewing angle. It should be noted that an example illustrated in FIG. 6 is not a related art.

Figure 6:
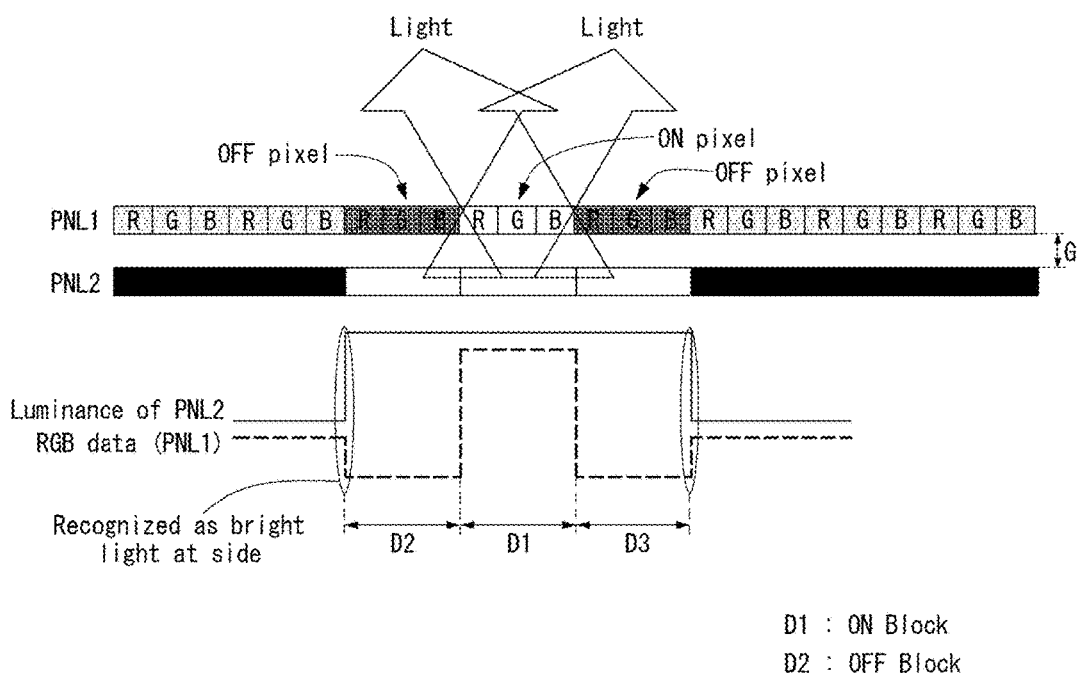
FIG. 6 illustrates an example of a bad bright line appearing when a dark block adjacent to a bright block in a light valve panel is turned on so as to prevent color distortion of a side viewing angle.

FIG. 6 illustrates an example of a bad bright line appearing when a dark block adjacent to a bright block of the light valve panel PNL2 is turned on so as to prevent the color distortion of the side viewing angle. The bright block is disposed under (or corresponding to) a bright pixel (hereinafter, referred to as "ON-pixel") of the display panel PNL1 and means a block (hereinafter, referred to as "ON-block") of the light valve panel PNL2 irradiating light onto the ON-pixel. The bright pixel (or the ON-pixel) is a pixel to which data of a high gray level, for example, a white gray level is applied. The dark block means a block (hereinafter, referred to as "OFF-block") of the light valve panel PNL2 disposed under (or corresponding to) a dark pixel (hereinafter, referred to as "OFF-pixel") adjacent to the ON-pixel of the display panel PNL1. The OFF-pixel is a pixel to which data of a low gray level, for example, a black gray level lower than the gray level of the ON-pixel is applied. As shown in FIG. 6, when luminances of the OFF-blocks adjacent to the ON-block increase, each of red, green, and blue data at the side viewing angle can seem to have a desired luminance. Therefore, the color distortion at the side viewing angle can be reduced or prevented.

On the other hand, when luminances of the OFF-blocks increase, luminances of the OFF-pixels may increase. Hence, luminances of the OFF-pixels at the front viewing angle may increase. In order to compensate for a reduction in image quality at the front viewing angle, the luminance of the OFF-pixel may be decreased using a modulation method for reducing a data value of the OFF-pixel adjacent to the ON-pixel. However, the modulation method may lead to the bright line phenomenon, in which a boundary between the OFF-pixel receiving data and the OFF-pixel receiving original data looks bright.

The embodiment of the invention adjusts a luminance of the light valve panel PNL2 through a gradation method by distributing the voltage to the block in a manner that a luminance of the OFF-block adjacent to the ON-block in the light valve panel PNL2 gradually changes, so as to reduce the luminance and the color distortion at the side viewing angle and prevent the bright line phenomenon. Further, the embodiment of the invention may control a gray level of the OFF-block adjacent to the ON-block in the light valve panel PNL2 in reverse of a gradation luminance control method of the OFF-block.

Figure 7:
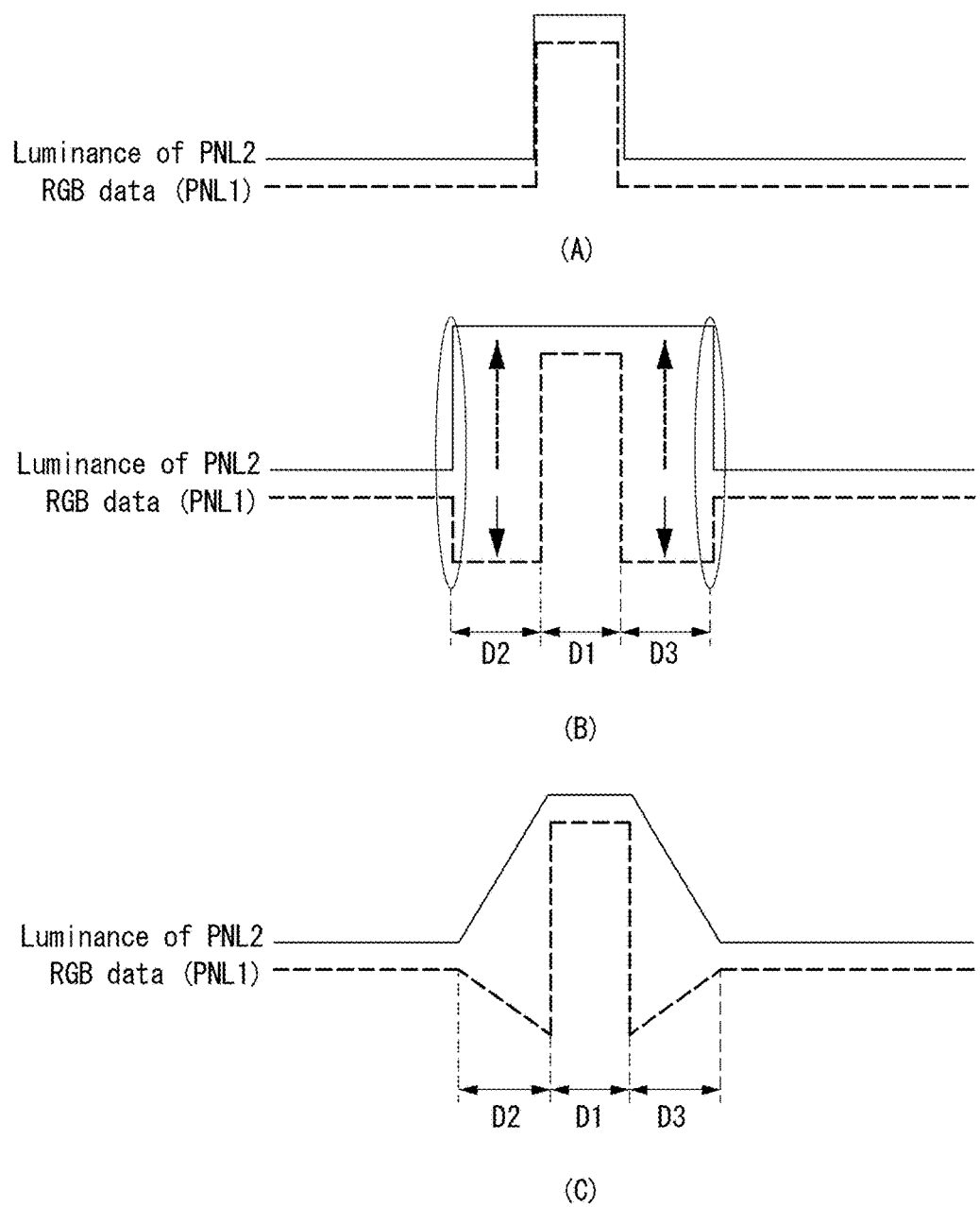
FIG. 7 illustrates a pixel data modulation method of a display panel and a block luminance control method of a light valve panel.
Figure 8:
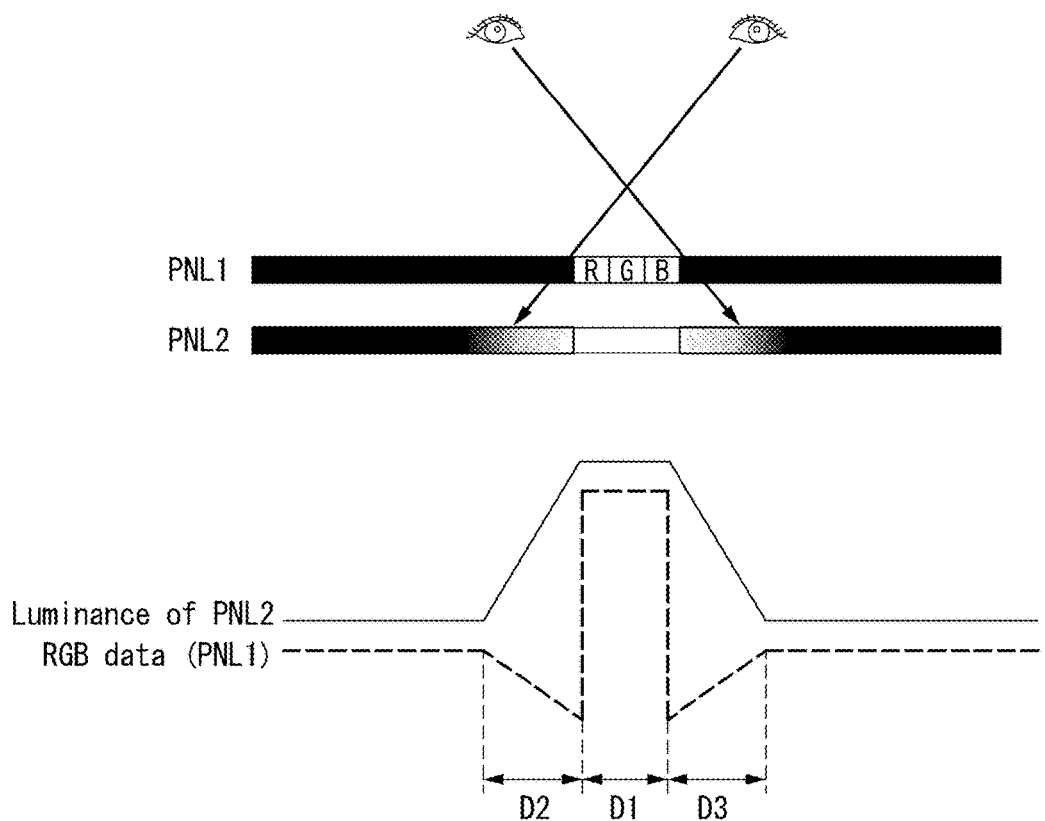
FIG. 8 illustrates a luminance of a pixel at a side viewing angle when data and a luminance of a display panel are controlled through a control method illustrated in (C) of FIG. 7.

FIG. 7 illustrates a pixel data modulation method of the display panel and a block luminance control method of the light valve panel. FIG. 8 illustrates a luminance of a pixel at a side viewing angle when data and a luminance of the display panel are controlled through a control method illustrated in (C) of FIG. 7.

In FIG. 7, D1 denotes a location of an ON-pixel and a location of an ON-block under the ON-pixel, and D2 and D3 denote a location of an OFF-pixel and a location of an OFF-block under the OFF-pixel.

(A) in FIG. 7 illustrates an example where data of a high gray level is applied only to an ON-pixel, and only an ON-block is turned on at a high luminance; and (B) in FIG. 7 illustrates a method for increasing a luminance of an OFF-block adjacent to the ON-block by a luminance of the ON-block and reducing a gray level of data to be applied to an OFF-pixel adjacent to the ON-pixel, so as to improve a side viewing angle.

(C) in FIG. 7 and FIG. 8 illustrate a method for gradually reducing a luminance of an OFF-block as the OFF-block is far away from the ON-block while increasing the luminance of the OFF-block adjacent to the ON-block by a luminance of the ON-block, so as to improve a side viewing angle and a bright line. Each block of the light valve panel PNL2 is divided into segment electrodes, and a luminance of the block increases and decreases in the gradation method depending on a voltage applied to the segment electrodes of each block. A size of the segment electrode may be set to a pixel size, and a backlight luminance can be adjusted on a per pixel basis. In this method, a gray level of data to be applied to the OFF-pixel adjacent to the ON-pixel can decrease, and a gray level of data to be applied to the OFF-pixel can gradually increase as the OFF-pixel is far away from the ON-pixel in one area of the OFF-block. Each block of the light valve panel PNL2 is disposed under pixels of the display panel PNL1 and irradiates light onto the pixels. Thus, there are OFF-pixels in the OFF-block adjacent to the ON-block, and gray levels of OFF-pixels can be individually adjusted as shown in (C) of FIG. 7 and FIG. 8. The pixel data modulation method may use the gradation method shown in (C) of FIG. 7. Other methods may be used. For example, a luminance of the light valve panel PNL2 may use the gradation method of (C) in FIG. 7, and the pixel data modulation method may use the method shown in (B) or (C) of FIG. 7.

Figure 9:
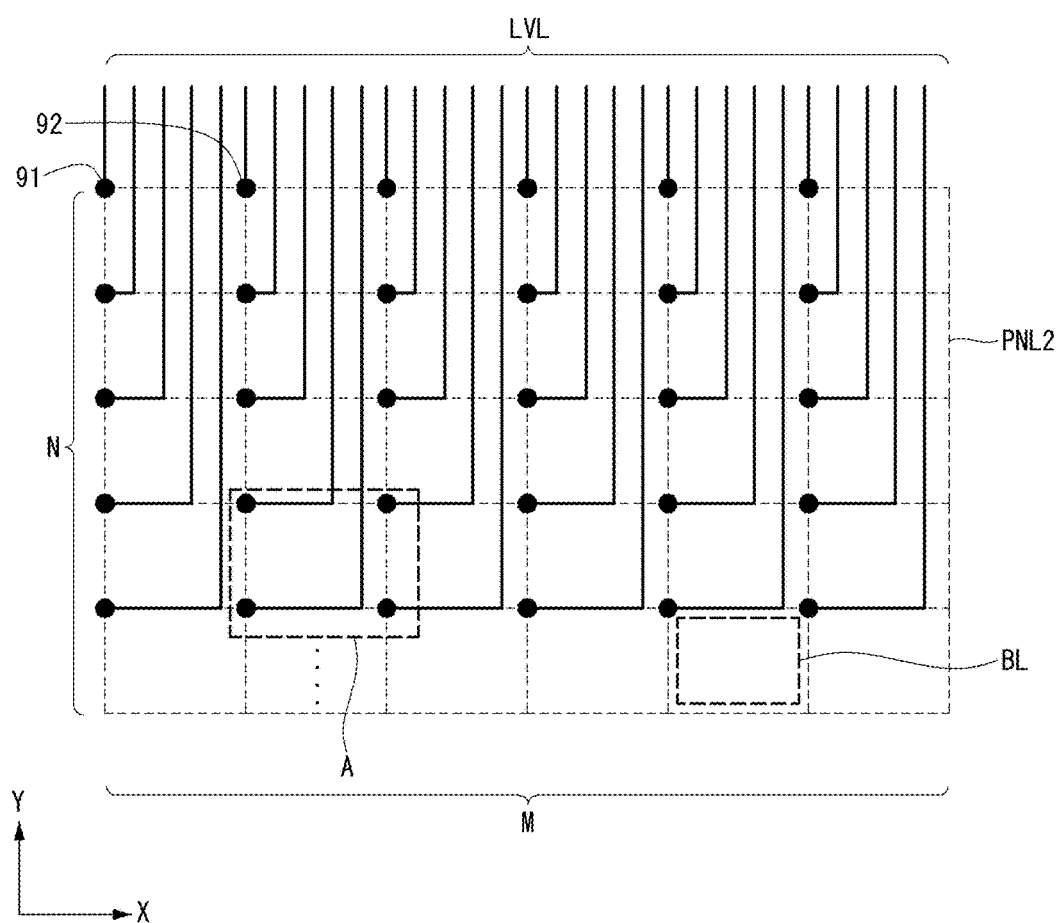
FIG. 9 is a plane view illustrating an example of dividing a light valve panel into blocks.
Figure 10:
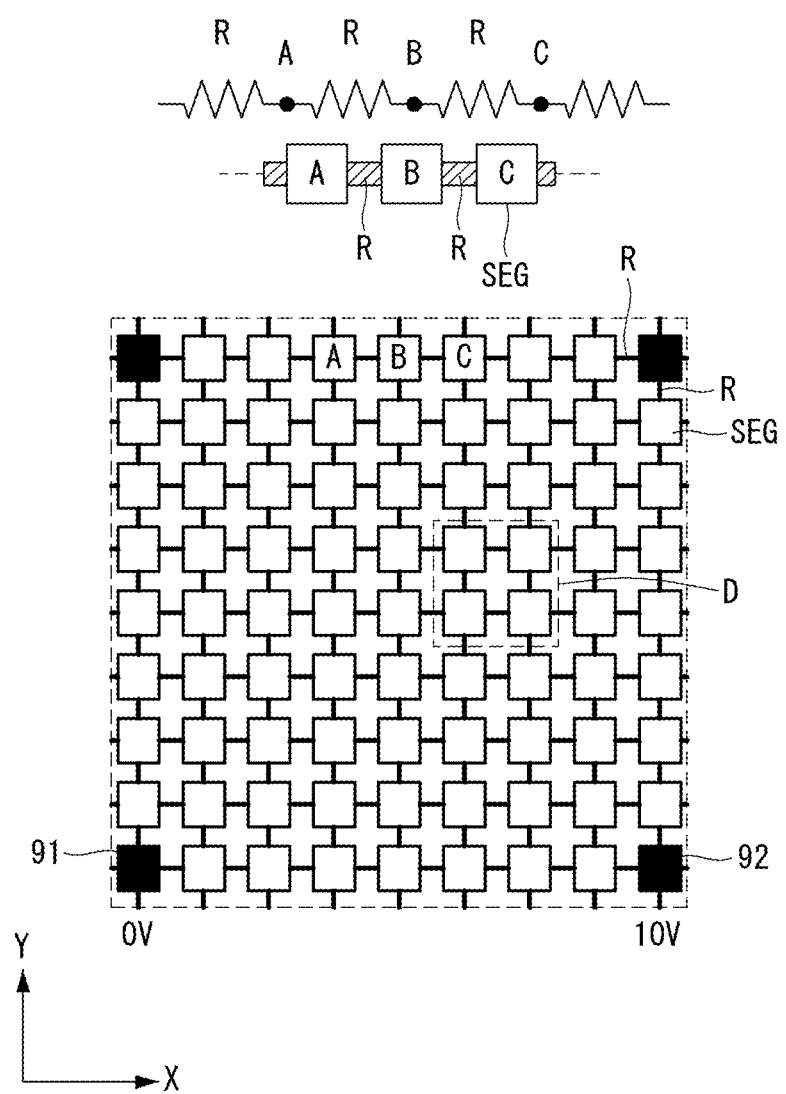
FIG. 10 is an enlarged view of a dotted line box A of FIG. 9 and is a plane view showing four voltage feeding positions of adjacent blocks, segment electrodes divided from the blocks, and resistance patterns between the segment electrodes.
Figure 11:
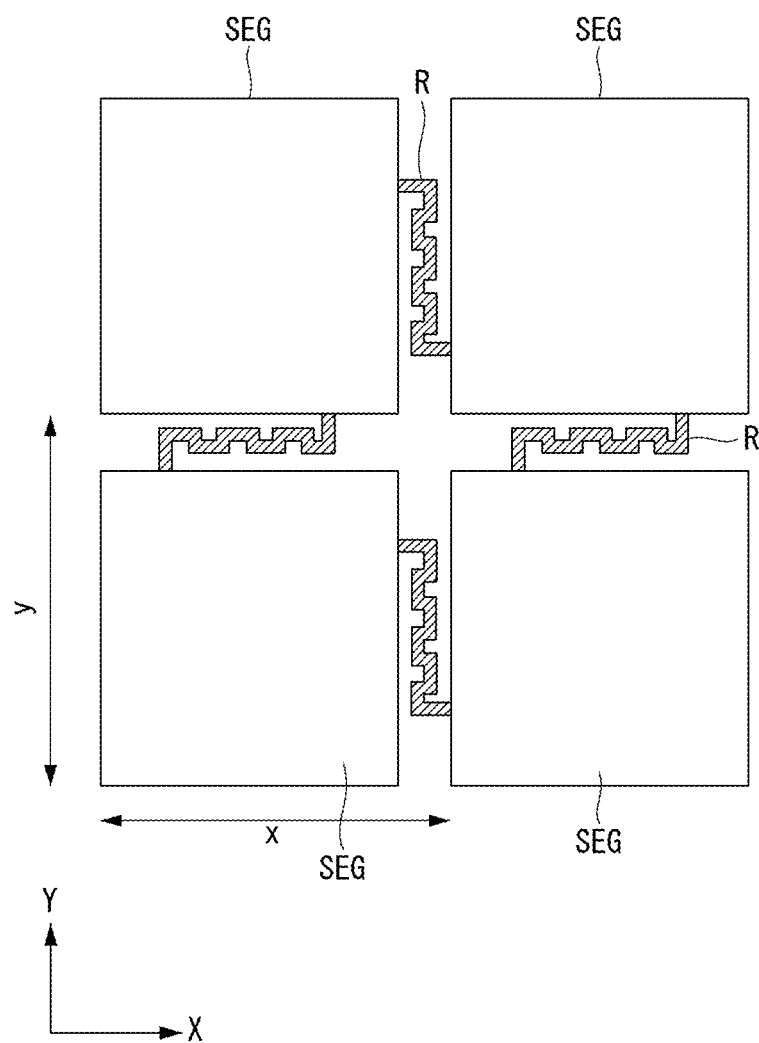
FIG. 11 is an enlarged plane view of a dotted line box D of FIG. 10.

FIG. 9 is a plane view illustrating an example of dividing the light valve panel PNL2 into blocks. FIG. 10 is an enlarged view of a box 'A' indicated by dotted line in FIG. 9 and is a plane view showing four voltage feeding positions 91 and 92 of adjacent blocks, segment electrodes divided from the block, and a resistance pattern between the segment electrodes. In FIG. 9, a dotted line box denoted by 'BL' indicates one block. FIG. 11 is an enlarged plane view of a dotted line box denoted by "D" of FIG. 10.

Referring to FIGS. 9 to 11, the light valve panel PNL2 is divided into M×N blocks BL, where M and N are a positive integer equal to or greater than 2. Each block BL is subdivided into m×n segment electrodes SEG, where m and n are a positive integer equal to or greater than 2. The adjacent segment electrodes SEG are connected through a resistance pattern R. The data input lines LVL, the resistance pattern R and the segment electrodes SEG may be formed of a transparent electrode material, for example, indium tin oxide (ITO), so as to prevent the moire phenomenon.

The data input line LVL is connected to the segment electrode SEG disposed at a voltage feeding position 91 positioned at an edge of each block. The data input line LVL and the segment electrode SEG are insulated from each other through an insulating layer, and the segment electrode SEG disposed at the edge 91 of the block is connected to the data input line LVL through a contact hole passing through the insulating layer.

The data voltage is directly supplied to the block BL through the data input line LVL. Thus, the light valve panel PNL2 does not require the TFT or the gate line (or the scan line).

The resistance pattern R between the segment electrodes SEG provides a resistance between segment electrodes A, B, and C, so that the segment electrodes A, B, and C can be supplied with different voltages. As shown in FIG. 10, when the data voltage of 0V is directly applied to a segment electrode SEG disposed at a voltage feeding position 91 of one of adjacent blocks, and a voltage of 10V is directly applied to a segment electrode SEG disposed at a voltage feeding position 92 of the other block, a voltage is distributed to segment electrodes SEG therebetween by a resistance. For example, a voltage is distributed to segment electrodes SEG between a segment electrode SEG supplied with the voltage of 0V and a segment electrode SEG supplied with the voltage of 10V by resistances of the resistance pattern, and a voltage between 0V and 10V is supplied to the segment electrodes SEG. The voltage applied to the segment electrode SEG varies depending on a position of the segment electrode SEG. For example, as a distance between a segment electrode SEG and the segment electrode SEG supplied with the voltage of by decreases, a voltage close to 10V may be applied to the segment electrode SEG. Further, as a distance between a segment electrode SEG and the segment electrode SEG supplied with the voltage of 0V decreases, a voltage close to 0V may be applied to the segment electrode SEG.

The voltage applied to the segment electrode SEG may be controlled depending on a resistance value of the resistance pattern R. As shown in FIG. 11, the resistance pattern R may be formed as a bent pattern of a zigzag shape and may connect the adjacent segment electrodes SEG. The resistance of the resistance pattern R may be adjusted depending on a length or a thickness of the resistance pattern R. For example, the resistance value may be increased by increasing the length of the resistance pattern R or decreasing the thickness of the resistance pattern R. On the other hand, the resistance value may be decreased by decreasing the length of the resistance pattern R or increasing the thickness of the resistance pattern R.

Figure 12:
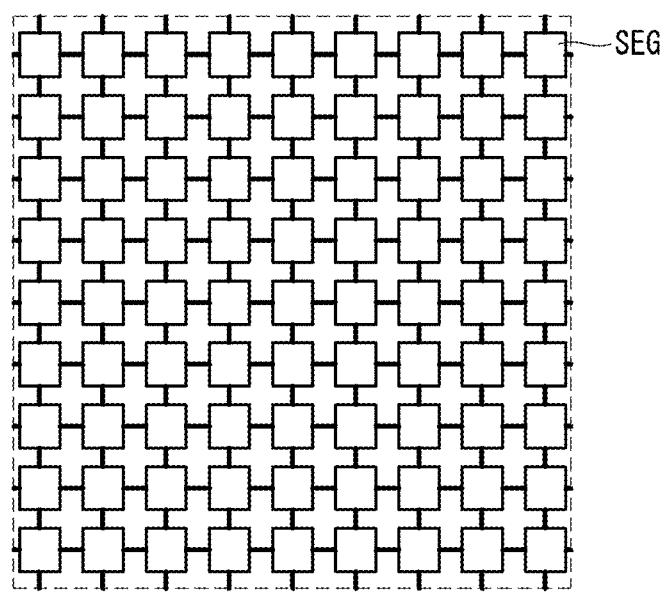
FIGS. 12 and 13 are plane views illustrating various disposition methods of segment electrodes.
Figure 13:
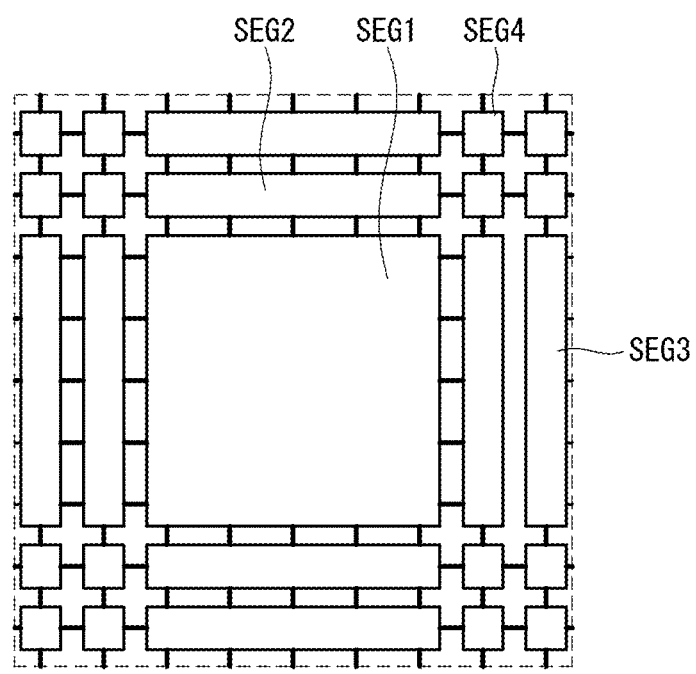

A structure of the segment electrodes SEG of the light valve panel PNL2 may be designed to various shapes as shown in FIGS. 12 and 13. Because the shape, the size, and the disposition of the segment electrodes SEG can be variously changed, the structure of the segment electrodes SEG is not limited to FIGS. 12 and 13. As shown in FIG. 12, segment electrodes SEG of the same size may be arranged in one block and may be connected through the resistance patterns R to form a mesh shape. As shown in FIG. 13, segment electrodes SEG1 to SEG4 in one block may have different sizes and shapes depending on a position and may be connected through the resistance patterns R to form a mesh shape. For example, as shown in FIG. 13, the first segment electrode SEG1 disposed in the middle of one block may be designed to a maximum size; the second and third segment electrodes SEG2 and SEG3 disposed on the upper, lower, left, and right sides of the first segment electrode SEG1 may be designed to be smaller than the first segment electrode SEG1; and the fourth segment electrodes SEG4 disposed at an edge of the one block may be designed to be smaller than the second and third segment electrodes SEG2 and SEG3.

Figure 16:
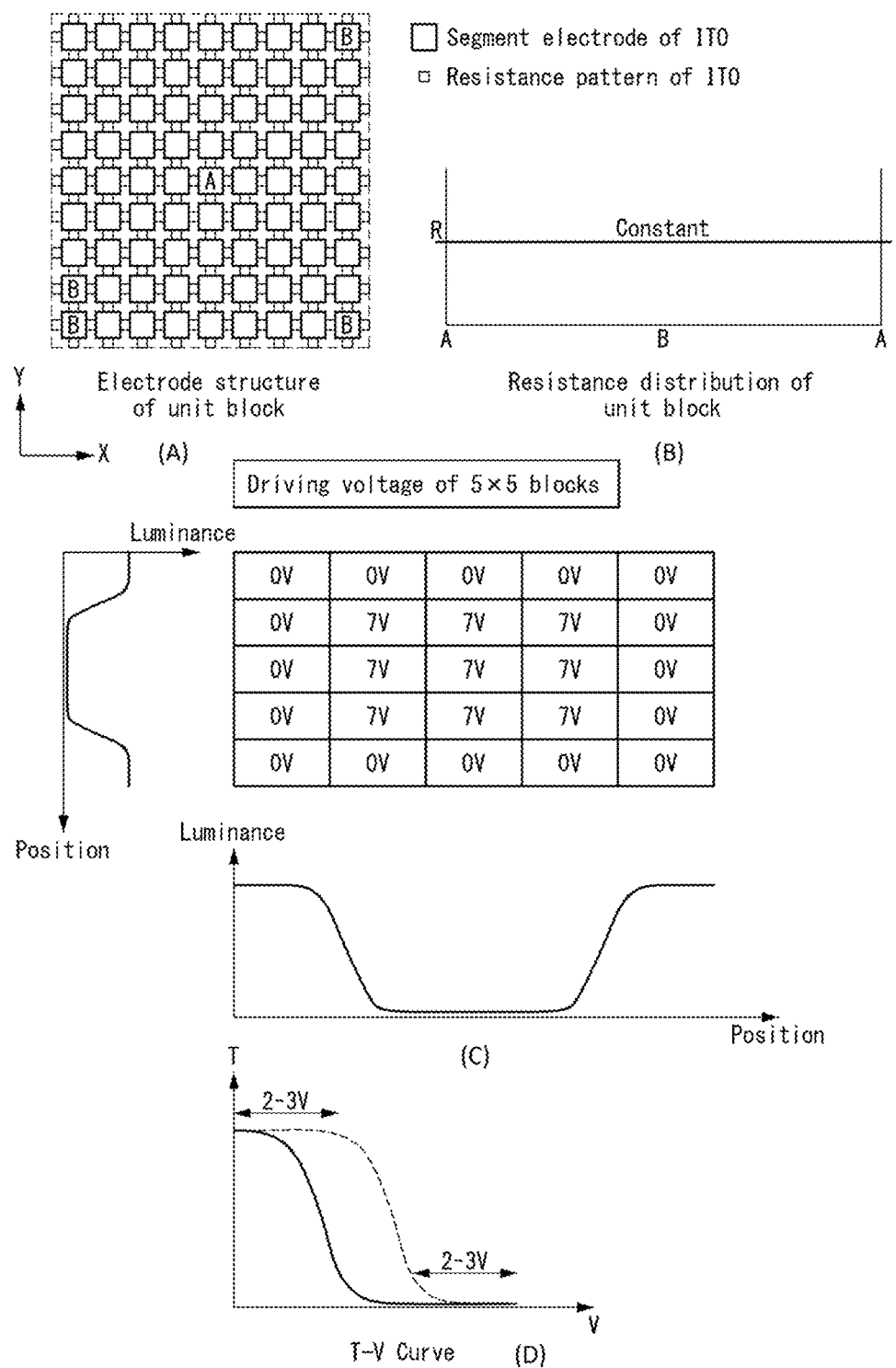

The liquid crystals of the light valve panel PNL2 may be driven in the TN mode. A luminance of the liquid crystal cell in the TN mode may be adjusted depending on a transmittance-voltage curve (hereinafter, referred to as "T-V curve") of normally white. As shown in FIG. 16, in the T-V curve of the normally white, as the voltage decreases, the transmittance (corresponding to Y-axis) increases. Hence, the luminance of the liquid crystal cell increases. On the contrary, as the voltage increase, the transmittance (corresponding to Y-axis) decreases. Hence, the luminance of the liquid crystal cell decreases.

Figure 17:
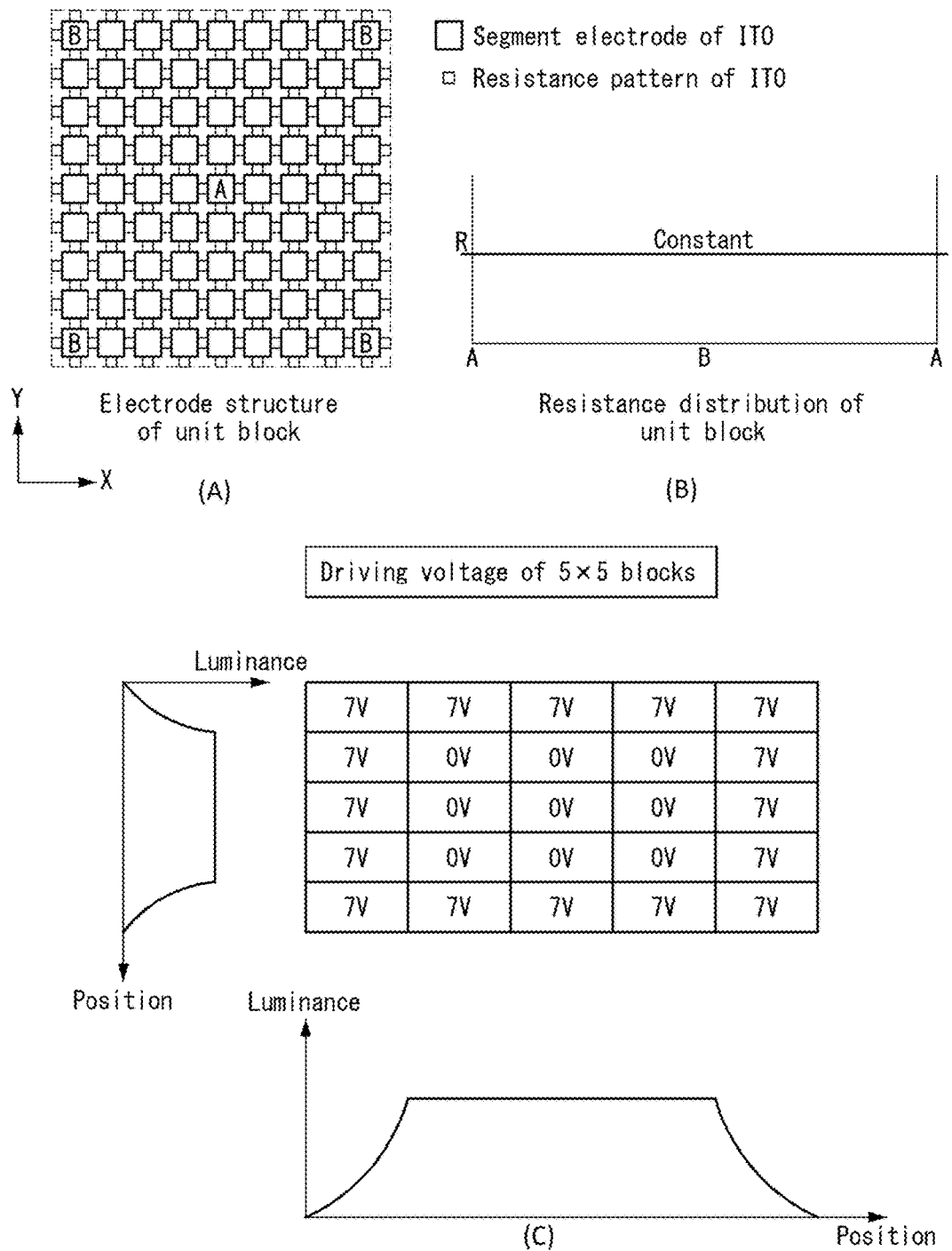

FIGS. 14 to 17 illustrate a simulation result of an electrode structure of the light valve panel shown in FIG. 12. (A) in FIG. 14, (A) in FIG. 15, (A) in FIG. 16 and (A) in FIG. 17 illustrate electrode structures of a unit block used for each simulation. Further, (B) in FIG. 14, (B) in FIG. 15, (B) in FIG. 16 and (B) in FIG. 17 illustrate a resistance distribution for each respective unit block. In a voltage distribution graph shown in (C) of FIG. 14 and (C) of FIG. 15, X-axis is a block position, and Y-axis is a voltage. In a luminance distribution graph shown in (C) of FIG. 16 and (C) of FIG. 17, X-axis is a block position, and Y-axis is a luminance.

Figure 14:
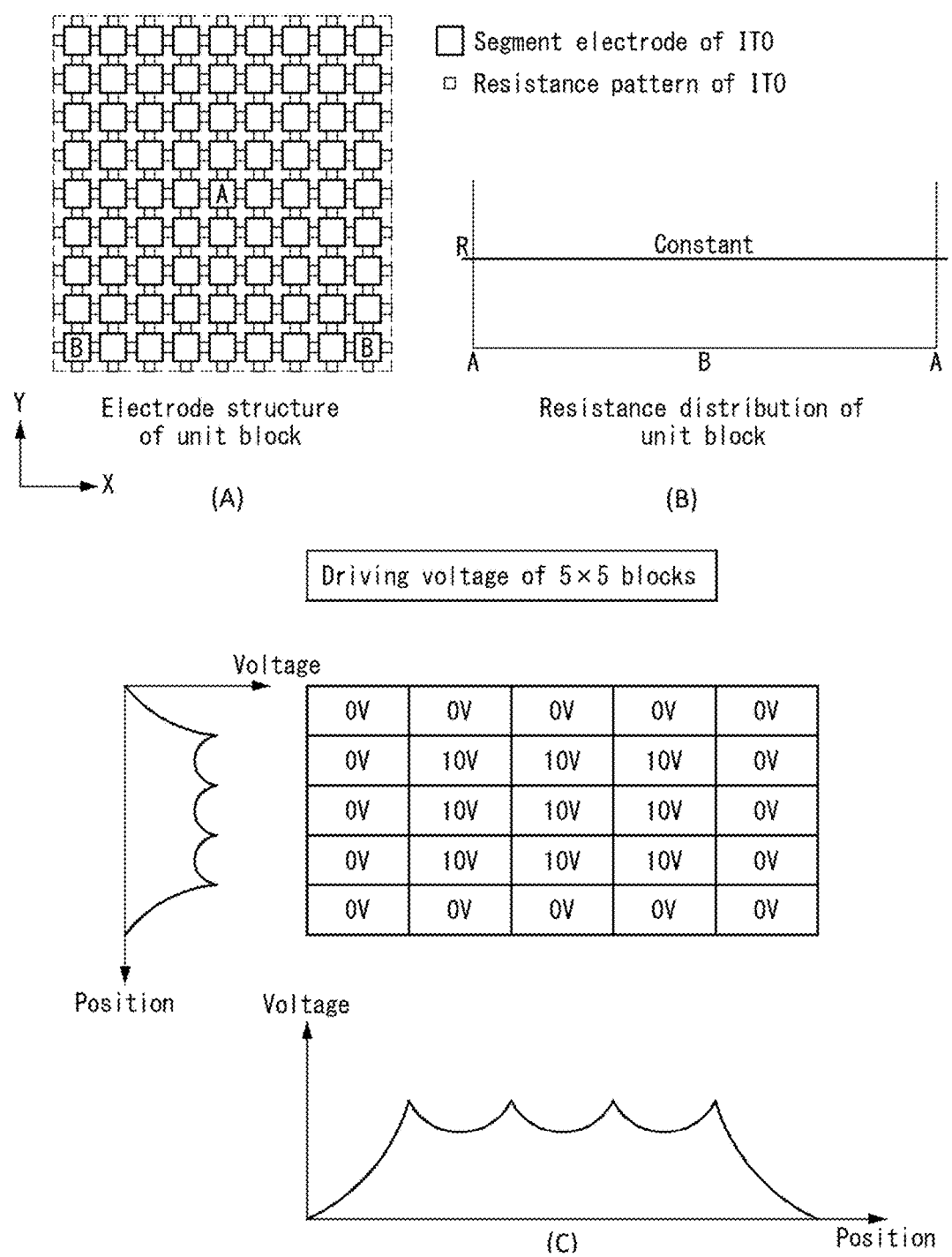
FIGS. 14 to 17 illustrate a simulation result of an electrode structure of a light valve panel shown in FIG. 12.

Referring to FIG. 14, in 5×5 blocks of which resistance values are uniformly distributed, 10V was supplied to nine blocks arranged in the middle, and 0V was supplied to remaining edge blocks. As a simulation result, it can be seen that a gradually changing voltage was distributed to OFF-blocks adjacent to an ON-block. A sharp voltage drop may be generated at a voltage feeding position, at which the voltage is directly supplied to the segment electrode SEG connected to the data input line. The segment electrode SEG, that is connected to the data input line and is directly supplied with the voltage, may be covered by a black matrix. However, as can be seen from the T-V curve of (D) in FIG. 16, because a peak voltage does not lead to a sharp change in a luminance of the liquid crystal cell, the black matrix may be omitted.

Figure 15:
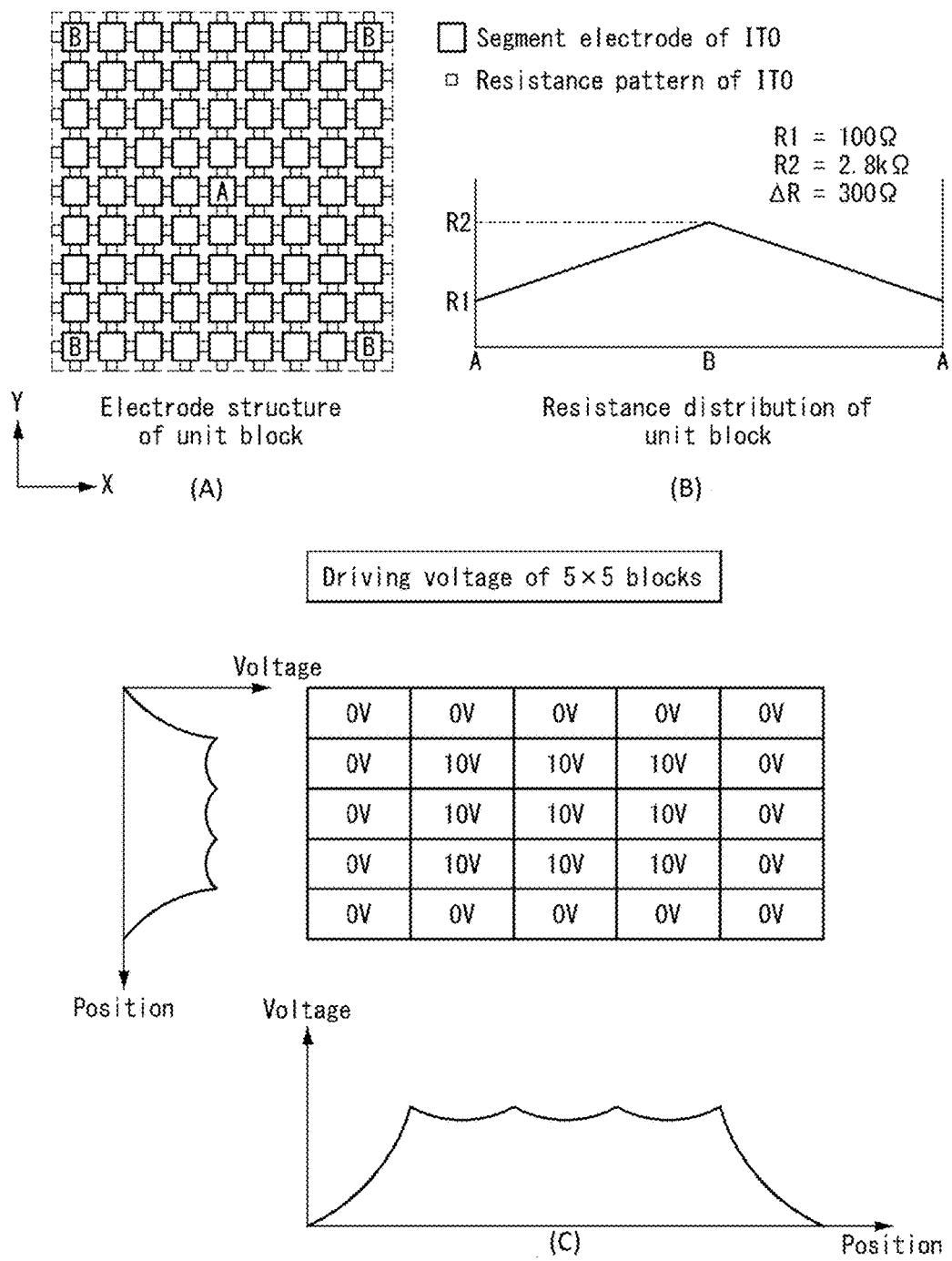

Referring to FIG. 15, the peak voltage may be reduced by differently applying a resistance to the adjacent segment electrodes SEG, and thus a sharp voltage change can be prevented. The peak voltage can be reduced by decreasing a resistance at a portion (i.e., a voltage feeding position), in which a large amount of current flows, and by increasing a resistance at a portion, in which a small amount of current flows.

Referring to FIGS. 16 and 17, in a simulation result of driving the light valve panel PNL2 in the TN mode, the peak voltage does not lead to a luminance variation because the luminance is constant in the T-V curve. In the T-V curve of (D) in FIG. 16, X-axis is a voltage (V), and Y-axis is a transmittance (T). In the T-V curve of (D) in FIG. 16, solid line and dotted line indicate two TN mode samples each having a different permittivity. The dotted line curve is a TN mode sample of a low permittivity.

Figure 18:
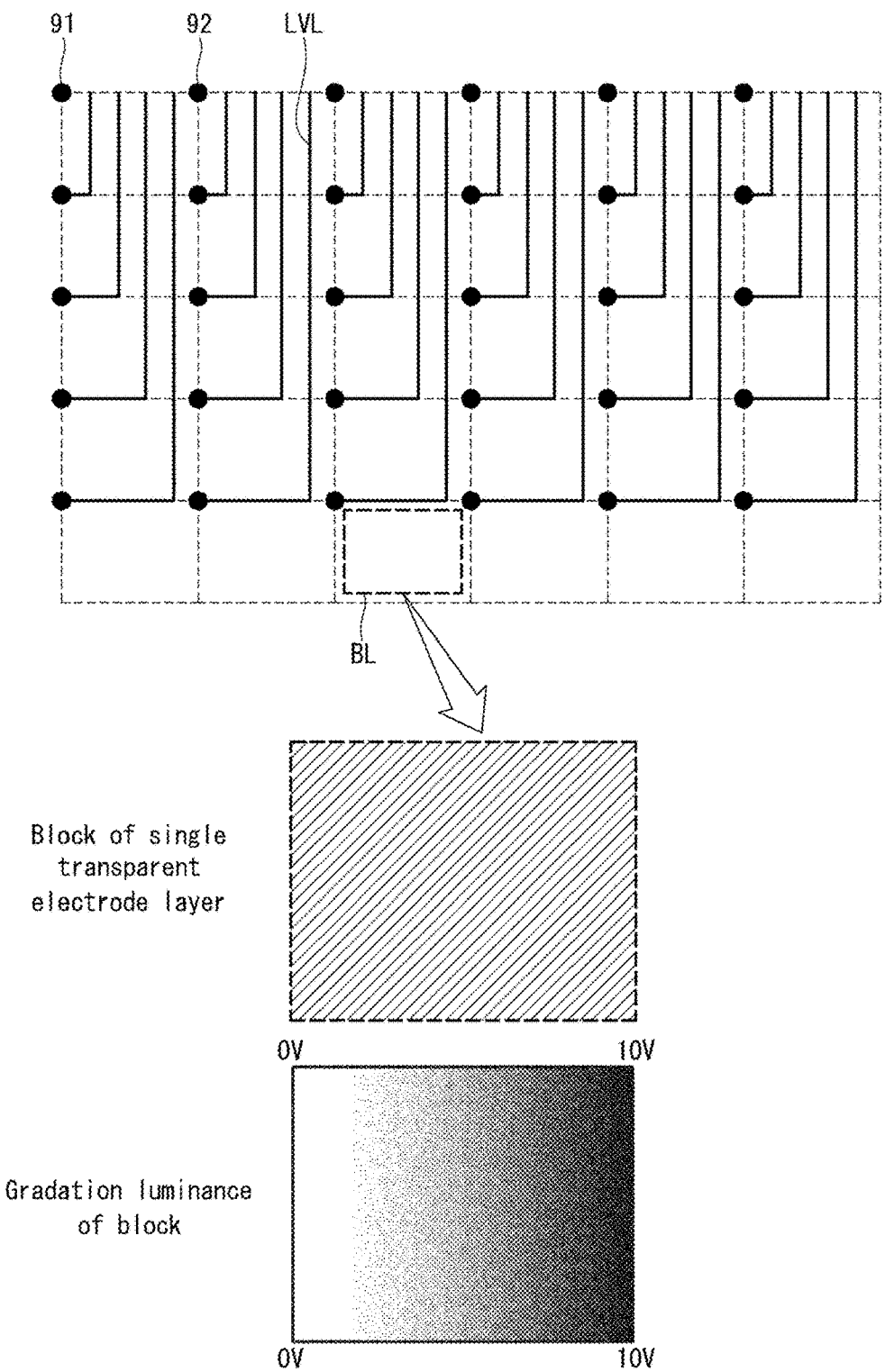
FIG. 18 illustrates a block structure of a light valve panel according to an embodiment of the invention.

FIG. 18 illustrates a block structure of a light valve panel according to an embodiment of the invention.

Referring to FIG. 18, a lower electrode of a light valve panel PNL2 may be formed as a single transparent electrode layer having a high resistance. When the data input lines are connected to each block of the transparent electrode layer of the high resistance at the voltage feeding positions, such as 91 and 92, a voltage distribution may be generated in each block without dividing the block into a resistance pattern and segment electrodes. For example, in a single transparent electrode having a high resistance, an increase in a voltage drop occurs as a distance between voltage feeding positions is greater. Hence, a luminance of the block may be adjusted through a gradation method that utilizes the resistance of the transparent electrode.

As described above, the embodiment of the invention can maximize a contrast ratio using the light valve panel and can prevent the moire phenomenon by supplying the data voltage to the blocks of the light valve panel through the data input lines without the TFT and the gate line and by forming the segment electrodes and the data input line of the block using the transparent electrode material.

The embodiment of the invention adjusts a luminance of the light valve panel through the gradation method so that a luminance of each block gradually increases or decreases, thereby preventing a luminance and color distortion at a side viewing angle and preventing the bright line phenomenon.

The embodiment of the invention can prevent the moire phenomenon and the bright line phenomenon and can further reduce the number of manufacturing processes of the light valve panel by simplifying a structure of the light valve panel, thereby increasing a yield. Furthermore, the embodiment of the invention omits a gate driving circuit for driving the light valve panel and thus can implement the cheap light valve panel.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A display device comprising:
    a display panel including a plurality of pixels;
    a backlight unit configured to irradiate light onto the display panel;
    data input lines to supply a voltage; and
    a light valve panel disposed between the display panel and the backlight unit and configured to control an amount of light irradiated by the backlight unit and to be incident on the display panel, the light valve panel including a plurality of blocks supplied with a voltage through the data input lines, each block among the plurality of blocks including a plurality of segment electrodes interconnected by a resistance pattern,
    wherein a voltage is distributed to the plurality of segment electrodes of each block based on the resistance pattern, and
    wherein each of the plurality of blocks overlaps with one or more pixels among the plurality of pixels and is configured to selectively block the light irradiated from the backlight unit from reaching the one or more pixels based on the voltage.

2. The display device of claim 1, wherein a luminance of a block among the plurality of blocks gradually increases or decreases from one end to the other end of the block based on the voltage distributed to segment electrodes of the block.

3. The display device of claim 2, wherein at least some of the plurality of segment electrodes are supplied with different voltages.

4. The display device of claim 3, wherein the voltage applied to each of the plurality of segment electrodes varies depending on a position of the corresponding segment electrode.

5. The display device of claim 1, wherein the plurality of segment electrodes and the resistance pattern include a transparent electrode material.

6. The display device of claim 5, wherein the transparent electrode material is indium tin oxide.

7. The display device of claim 6, wherein the display panel includes:
   a first pixel configured to display high gray level data; and
   a second pixel positioned adjacent to the first pixel and configured to display low gray level data that is lower than the high gray level data,
   wherein the light valve panel further includes:
   a first block among the plurality of blocks that is disposed in correspondence with the first pixel and configured to irradiate light onto the first pixel; and
   a second block among the plurality of blocks that is disposed in correspondence with the second pixel and configured to irradiate light onto the second pixel, and
   wherein a luminance of the second block gradually decreases as a distance to the second block increases from the first block based on the voltage distributed to the second block.

8. The display device of claim 7, wherein a gray level of the second pixel is reduced to below the low gray level.

9. The display device of claim 8, wherein as a distance to the second pixel increases from the first pixel, a gray level of data to be applied to the second pixel gradually increases.

10. The display device of claim 1, wherein each of the plurality of blocks includes a segment electrode among the plurality of segment electrodes that is connected to at least one of the data input lines, positioned at an edge of the corresponding block and supplies the voltage to the corresponding block.

11. The display device of claim 1, wherein the resistance pattern is formed as a bent pattern of a zigzag shape.

12. The display device of claim 1, further comprising a plurality of feeding positions provided as a connection portion between the data input lines and the plurality of blocks,
   wherein the voltage that is distributed to the plurality of segment electrodes of each of the plurality of blocks is based on a resistance difference that varies based on a distance between the plurality of voltage feeding positions.

13. The display device of claim 1, wherein the light valve panel is configured to adjust the amount of light irradiated by the backlight unit depending on an input image provided by the data input lines.

14. The display device of claim 1, wherein some segment electrodes among the plurality of segment electrodes within at least one block among the plurality of blocks have different shapes and different sizes.

15. The display device of claim 14, wherein a segment electrode in a center of the at least one block is larger than other segment electrodes within the at least one block.

16. The display device of claim 1, wherein one block among the plurality of blocks is configured to provide a gradation in which one side of the one block blocks more light than an opposite side of the one block.

17. A display device comprising:
   a display panel;
   a backlight unit configured to irradiate light onto the display panel;
   data input lines to supply a voltage; and
   a light valve panel disposed between the display panel and the backlight unit and configured to control an amount of light irradiated by the backlight unit and to be incident on the display panel,
   wherein the light valve panel includes a single transparent electrode layer supplied with the voltage through the data input lines,
   wherein the single transparent electrode layer is divided into a plurality of blocks and each of the plurality of blocks is connected to at least one of the data input lines such that a voltage distribution is generated in each of the plurality of blocks, and
   wherein each of the plurality of blocks overlaps with one or more pixels among the plurality of pixels and is configured to selectively block the light irradiated from the backlight unit from reaching the one or more pixels based on the voltage.

18. The display device of claim 17, wherein the single transparent electrode layer is formed of indium zinc oxide.

19. The display device of claim 17, wherein the light valve panel is configured to adjust an amount of light irradiated by the backlight unit depending on an input image displayed on the display panel.

20. The display device of claim 17, further comprising a plurality of feeding positions provided as a connection portion between the data input lines and the plurality of blocks,
   wherein the voltage distribution generated in each of the plurality of blocks is based on a resistance difference that varies based on a distance between the plurality of voltage feeding positions.

* * * * *